(12) United States Patent
Tyler

(10) Patent No.: US 8,655,811 B2
(45) Date of Patent: Feb. 18, 2014

(54) METHOD AND SYSTEM FOR DATA STREAM IDENTIFICATION BY EVALUATION OF THE MOST EFFICIENT PATH THROUGH A TRANSFORMATION TREE

(75) Inventor: Ross E. Tyler, San Dimas, CA (US)

(73) Assignee: Raytheon Company, Waltham, MA (US)

( * ) Notice: Subject to any disclaimer, the term of this patent is extended or adjusted under 35 U.S.C. 154(b) by 603 days.

(21) Appl. No.: 12/696,196

(22) Filed: Jan. 29, 2010

(65) Prior Publication Data

US 2010/0191698 A1 Jul. 29, 2010

Related U.S. Application Data

(60) Provisional application No. 61/148,303, filed on Jan. 29, 2009.

(51) Int. Cl.
G06F 15/18 (2006.01)
G06F 17/00 (2006.01)
G06N 5/00 (2006.01)

(52) U.S. Cl.
USPC .............................................. 706/14; 706/45

(58) Field of Classification Search
None
See application file for complete search history.

(56) References Cited

U.S. PATENT DOCUMENTS

| 6,513,004 | B1 * | 1/2003 | Rigazio et al. ................. 704/254 |
| 7,356,480 | B2 * | 4/2008 | Cohen .......................... 705/7.11 |
| 2006/0195201 | A1 * | 8/2006 | Nauck et al. ..................... 700/30 |
| 2008/0293353 | A1 * | 11/2008 | Mody et al. ........................ 455/1 |
| 2010/0023327 | A1 * | 1/2010 | Jung et al. ..................... 704/225 |

OTHER PUBLICATIONS

Spooner, C.M.; , "Application of local discriminant bases to HRR-based ATR," Signals, Systems and Computers, 2001. Conference Record of the Thirty-Fifth Asilomar Conference on , vol. 2, No., pp. 1067-1073 vol. 2, Nov. 4-7, 2001.*
Lunden, J.; Koivunen, V.; , "Automatic Radar Waveform Recognition," Selected Topics in Signal Processing, IEEE Journal of , vol. 1, No. 1, pp. 124-136, Jun. 2007.*
Pearlman, W.A.; Jakatdar, P.; Leung, M.M.; , "Adaptive transform tree coding of images," Selected Areas in Communications, IEEE Journal on , vol. 10, No. 5, pp. 902-912, Jun. 1992.*
Deng, H. and H. Ling, "Clutter reduction for synthetic aperture radar imagery based on adaptive wavelet packet transform," Progress in Electromagnetics Research, vol. 29, 1-23, 2000.*
Krongold, B.S.; Ramchandran, K.; Jones, D.L.; , "Frequency-shift-invariant orthonormal wavelet packet representations," Signal Processing, IEEE Transactions on , vol. 47, No. 9, pp. 2579-2582, Sep. 1999.*

(Continued)

*Primary Examiner* — Kakali Chaki
*Assistant Examiner* — Daniel Pellett
(74) *Attorney, Agent, or Firm* — Pierce Atwood LLP; Joseph M. Maraia

(57) ABSTRACT

A method for data stream identification includes receiving a data stream from a data source and executing a first transform on the data stream to determine if the data stream comprises a first characteristic associated with the first transform. The first transform is part of a transform tree comprising a plurality of transforms arranged in a hierarchy. The method includes executing one or more additional transforms to determine if the data stream comprises one or more additional characteristics associated with the one or more additional transforms and computing an efficiency level associated with the execution of each transform. The method also includes identifying a path through the transform tree wherein the computed efficiency level of each transform in the path is above a threshold value to determine characteristics of the data stream.

14 Claims, 4 Drawing Sheets

(56) References Cited

OTHER PUBLICATIONS

Turhan-Sayan, G., "Real time electromagnetic target classification using a novel feature extraction technique with PCA-based fusion," Antennas and Propagation, IEEE Transactions on, vol. 53, No. 2, pp. 766,776, Feb. 2005.*

Definition of efficiency retrieved from the Oxford American College Dictionary online. (2002).*

Spooner, "Application of Local Discrimination Bases to HRR-Based ATR," Mission Research Corporation, pp. 1067-1073, Nov. 2001.

Lunden, "Automatic Radar Waveform Recognition," IEEE Journal of Selected Topics in Signal Processing, vol. 1, No. 1, pp. 124-136, Jun. 2007.

PCT Notification of Transmittal of the International Search Report and the Written Opinion of the International Searching Authority, or the Declaration, Intl. Application No. PCT/US2010/022503, Intl. Filing date Jan. 29, 2010, 15 pages, Nov. 5, 2010.

* cited by examiner

METHOD AND SYSTEM FOR DATA STREAM IDENTIFICATION BY EVALUATION OF THE MOST EFFICIENT PATH THROUGH A TRANSFORMATION TREE

CROSS-REFERENCE TO RELATED APPLICATION

This application claims the benefit of U.S. Provisional Application Ser. No. 61/148,303 filed on Jan. 29, 2009, which is hereby incorporated by reference.

TECHNICAL FIELD OF THE DISCLOSURE

This disclosure generally relates to data streams, and more particularly, to a method and system for data stream identification by evaluation of the most efficient path through a transformation tree.

BACKGROUND OF THE DISCLOSURE

Military operations are often performed by multiple organizations that function together to achieve a common goal. For example, a country's army may coordinate its operations with its air force and/or its navy to conduct a military operation. Moreover, the country's army may be segregated into multiple regiments that operate independently of one another. Military organizations such as these are often implemented due to their relatively efficient adaptability to ever changing conditions on the battlefield.

Military operations often use radars for identifying objects such as aircraft in a battlefield. These military operations may be conducted by multiple organizations that function together to achieve a common goal. In many cases, radar equipment used by each organization operates with a unique protocol that is well suited to its particular needs. Thus, radar equipment used by the various organizations may vary significantly from one another, which may hinder the ability of one organization to consume the data streams that are produced by radar equipment of another organization.

SUMMARY OF THE DISCLOSURE

According to one embodiment, a method for data stream identification includes receiving a data stream from a data source and executing a series of transforms from a transform tree. A transform is an operation performed on data and is used to determine a particular characteristic of the data. The first transform is executed on the data stream, and the subsequent transforms are executed on the output of their parent transforms. The efficiency of each transform is computed, and the most efficient path through the transform tree is identified. The transforms associated with the most efficient path through the transform tree are the sequence of transforms necessary to consume the data encapsulated in the data stream.

According to another embodiment, a system for data stream identification includes a processor operable to receive a data stream from a data source and execute a first transform on the data stream to determine if the data stream comprises a first characteristic associated with the first transform. The first transform is part of a transform tree comprising a plurality of transforms arranged in a hierarchy. The processor is also operable to execute one or more additional transforms to determine if the data stream comprises one or more additional characteristics associated with the one or more additional transforms and compute an efficiency level associated with the execution of each transform. The processor is also operable to identify a path through the transform tree wherein the computed efficiency level of each transform in the path is above a threshold value.

The various embodiments of the disclosure may provide numerous technical advantages. For example, one embodiment is operable to determine the sequence of transforms necessary to consume a radar data stream. This is beneficial for configuring a radar consumption device to consume the data encapsulated in the radar data stream.

Another advantage of particular embodiments is the ability to simultaneously execute multiple transforms using a multi-threading execution scheme. By executing multiple transforms on a data stream in separate threads, the sequence of transforms needed to consume the data stream may be determined in a timely manner with a relatively high degree of performance.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Figure 1:
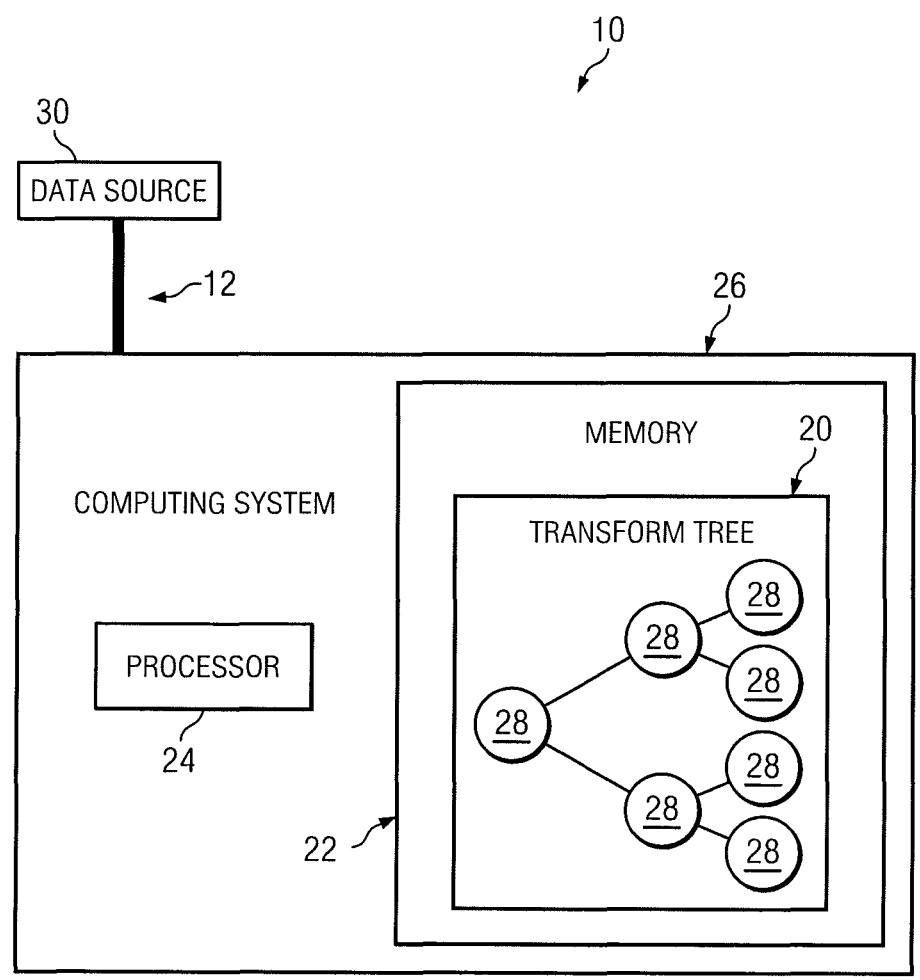
FIG. 1 is an illustration showing one embodiment of a data stream identification system for identifying the sequence of transforms used to consume a data stream.

In accordance with a particular embodiment, the most efficient sequence of transforms for consuming the data encapsulated in a data stream is determined. Because data streams are transmitted in different ways and using different protocols, consumption of a particular data stream is achieved using a unique sequence of transforms associated with the particular data stream. As there are often similarities between the sequence of transforms used to consume different data streams, a set of transform sequences can be represented by a tree of transforms. Branches in the tree reflect where the sequence of transforms diverge. The universe of potential types of data streams expected to be encountered is represented by the transform tree. The different transforms in the tree are designed to operate with different data streams. For example, the root transform is designed to operate with the original raw data stream that is received from a data source. The other transforms are designed to expect the type of data stream that their parent transforms are designed to output. To identify the sequence of transforms necessary to consume a particular data stream, the raw data stream is initially received from a data source. The root transform of the transform tree is executed using the data stream as input, and an efficiency level associated with the root transform is computed. The transforms that are children of the root transform are then executed using the output from the root transform as input, and their respective efficiency levels are computed. This process continues until efficiency levels have been computed for all transforms in the transform tree. Transforms that are downstream from inefficient transforms (transforms who produce little output compared with their input) still get executed. Although these transforms may have little data to operate on, it is not because they are inefficient but because their superiors were inefficient. After the efficiency of every transform has been computed, the most efficient path through the transform tree will identify the best sequence of transforms for consuming the data stream.

Particular embodiments implement data stream identification methods disclosed herein in a radar application. Radar equipment used by different organizations around the world varies widely in how it functions. In many cases, radar equipment used by each organization operates using a radar type with a unique protocol that is well suited to its particular needs. Radar consumption devices consume the data streams from radar equipment. Generally, a radar consumption device must be configured to know what radar type to expect. If a data stream is received by a radar consumption device, it can only be processed if the radar type used to send the data stream can be determined. This can be done by attempting to guess the protocol components of the data stream and manually configuring the radar consumption device until it appears to process the signal properly. However, configuration using this manual method is a time intensive, hit or miss process. In particular embodiments, an input radar signal is processed through a transform tree comprising a plurality of protocol identification objects to determine a protocol stack of the radar signal.

FIG. 1 is an illustration showing one embodiment of a data stream identification system 10 according to the teachings of the present disclosure. Data stream identification system 10 includes a computing system 26 capable of receiving a data stream 12 from data source 30. In one embodiment, data source 30 is radar equipment capable of transmitting radar signals. Computing system 26 includes a processor 24 and memory 22 which includes transform tree 20 composed of multiple transforms 28 arranged in a hierarchy. A transform 28 is an operation performed on data and is associated with a particular characteristic in order to determine whether the data includes that characteristic. The operation performed by each transform 28 is unique. The transforms 28 in transform tree 20 are executed beginning with the root transform 28. The root transform 28 is executed on data stream 12, and each subsequent transform 28 is executed on the data output from its parent transform. The efficiency of each transform 28 is computed, and the most efficient path through the transform tree is identified. The most efficient path through the transform tree 20 corresponds to the sequence of transforms necessary to consume the data encapsulated in data stream 12. This sequence of transforms reveals characteristics of data stream 12.

Processor 24 may be a microprocessor, controller, or any other suitable computing device, resource, or combination of hardware, software and/or encoded logic operable to perform functionality associated with data stream identification system 10. Memory 22 may be any form of volatile or non-volatile memory including, without limitation, magnetic media, optical media, random access memory (RAM), read-only memory (ROM), removable media, or any other suitable local or remote memory component, for storing information associated with the data stream identification functionality discussed herein.

Memory 22 includes stored instructions that are executed by a processor 24 of a computing system 26. Computing system 26 may be a network coupled computing system or a stand-alone computing system. The stand-alone computing system may be any suitable computing system, such as a personal computer, laptop computer, or mainframe computer capable of executing instructions stored in memory 22. The network computing system may be a number of computers coupled together via a network, such as a local area network (LAN), a metropolitan area network (MAN), or a wide area network (WAN). In one embodiment, computing system 26 operates a multi-threaded environment such that multiple threads may be initiated for identification of data streams 12.

Figure 2:
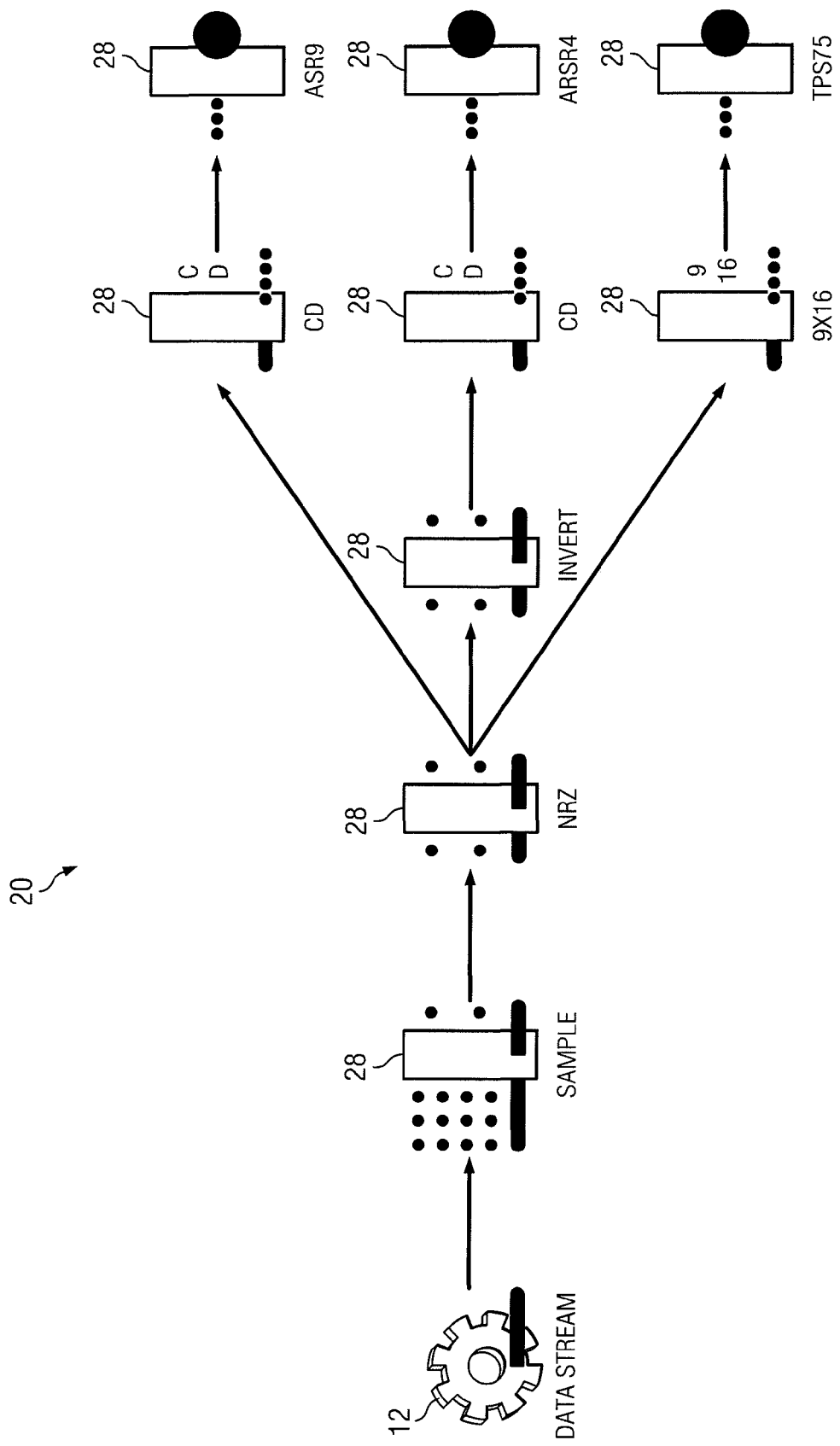
FIG. 2 is an illustration showing one embodiment of a transform tree that may be used with the data stream identification system of FIG. 1.

FIG. 2 is an illustration showing one embodiment of transform tree 20 that may be used with the data stream identification system 10 of FIG. 1. Transform tree 20 includes multiple transforms 28 arranged in a hierarchical fashion. That is, a particular transform 28 may be the root of one or more other transforms 28. Transforms 28 are arranged such that every path through the transform tree 20 corresponds to the sequence of transforms required to consume a particular radar type. The branches in this transform tree correspond to where the sequence of transforms used by different radar types diverge. Although the particular transform tree 20 as shown is used to identify radar data streams 12 generated by ARSR4, ASR9, and TPS75 radar systems, transform tree 20 may include any type or quantity of transforms 28 for identifying radar data streams 12 generated by other radar systems.

Data streams 12 received by radar equipment represent streams of bits and may include several protocol components, such as clock speed, bit encoding scheme, message framing, message synchronization, and/or other characteristics specific to each radar type that together determine the radar type of a received data stream 12. Typical bit encoding schemes include non-return-to-zero (NRZ), non-return-to-zero inverted (NRZI), biphase space, and inverted encoding. Typical message framing schemes include common digitizer (CD) framing, 9-by-16 framing, and HDLC framing. Each transform 28 in transform tree 20 of FIG. 2 corresponds to a protocol component that makes up a particular radar type. Thus, in this radar application each transform 28 acts as a protocol identification object.

For the particular transform tree 20 illustrated in FIG. 2, when processor 24 receives a data stream 12 from data source 30, processor 24 will first execute the "sample" transform because it is at the root of the transform tree 20. The "sample" transform over-samples the data stream 12 to infer the clock speed used for transmission of data stream 12 by the radar equipment 18. The "sample" object can then generate a synchronous digital stream using the inferred clock speed.

Processor 24 then executes the transform 28 that is a child of the "sample" transform 28, which in this particular case, is the "NRZ" transform 28. The "NRZ" transform 28 attempts to retrieve information from the synchronous digital stream generated by the "sample" transform object using a non-return-to-zero (NRZ) bit encoding scheme. The result of this attempt to retrieve information may be measured as a level of efficiency. That is, "NRZ" transform 28 may compute an efficiency level relative to the efficiency of the attempt to retrieve information using a non-return-to-zero bit encoding scheme. In one embodiment, efficiency is calculated as the ratio of useful output to total input, where useful output is the amount of useful data obtained from the attempt to retrieve information, and total input is the amount of data processed in the attempt to retrieve information. The processor 24 then compares the computed efficiency with a threshold value of efficiency to determine if the computed efficiency is greater than the threshold value of efficiency. The computed efficiency is used later to determine the most efficient path through the transform tree 20.

Next, the transforms that are children of the "NRZ" transform are executed on the stream of bits produced by the "NRZ" transform. Thus, a "CD" transform 28, an "INVERT" transform 28, and a "9×16" transform 28 are each executed, and the efficiency associated with using common digitizer (CD) framing, inverted framing, and 9-by-16 framing, respectively, is calculated. The remaining transforms 28 are executed similarly to the manner described with respect to "NRZ" transform 28 in which each child transform 28 is executed using the data output from its parent transform 28. In this manner, processor 24 continues throughout the rest of transform tree 20 until the efficiency level of all transforms 28 have been computed.

Once the efficiency level of all transforms 28 in the transform tree 20 of FIG. 2 have been computed, the most efficient path through the transform tree can be identified. The most efficient path through the transform tree is the path where the efficiency level of every transform is above the threshold value of efficiency. If there are multiple paths, then the threshold value may be increased until there is only one path where every transform in the path has an efficiency above the threshold value. If there are no paths through the transform tree where every transform has an efficiency level above the threshold value, then efficiency threshold may be decreased until the efficiency levels of the transforms in at least one path are above the threshold value. If no paths through the transform tree can be identified then the radar type of data stream 12 is outside of the universe of radar types represented by transform tree 20 of FIG. 2. The most efficient path represents the sequence of transforms necessary to consume the data encapsulated in data stream 12. For example, if the path corresponding ASR9 was the most efficient path, then the sequence of transforms necessary to consume the data encapsulated in the data stream 12 is a "sample" transform followed by an "NRZ" transform, "CS" transform, and "ASR9" transform.

This process of calculating efficiencies and determining the most efficient path is continued periodically as the data stream 12 continues to be supplied by the data source 30. The threshold value of efficiency may be updated by a user while the transforms operate such that the number of efficient paths increases or decreases. When the user has identified the most efficient path, the user may stop the transforms.

In one embodiment, processor 24 initiates a new thread for each transform 28. A thread generally refers to an execution fork performed by computing system 26 that allows processing of instructions to continue concurrently with other processes executed on computing system 26. Certain embodiments using a multi-threaded approach to data stream identification may provide an advantage in that multiple transforms 28 may be simultaneously executed with a relatively high degree of performance. Performing multiple transformations concurrently saves system resources and makes the process for determining the sequence of transforms necessary to consume a data stream 12 much more efficient and much less time consuming.

Transforms 28 of transform tree 20 may be constructed of any suitable type of object. In one embodiment, transforms 28 are modeled as JAVA beans constructed according to an XML protocol. Using JAVA beans, transforms 28 may be expressed using an XML modeling language rather than JAVA code. This allows the transforms 28 to be human readable and/or editable. Thus, it allows for modifying existing transforms 28 or creating new transforms 28 for analysis of other types of data streams 12. Java code for the transforms 28 is generated from the XML modeling language, and that code is compiled by a JAVA compiler.

In one embodiment, information obtained during execution of a transform 28 is logged. For example, the data input to the transform, the data output from the transform, and the specific transform operation used may be logged. The log can be viewed by a user and may be used in conjunction with the computed efficiency to determine the effectiveness of a transform 28.

In some embodiments, there are special "recording" transforms that take their input and transform it to file content. The recording transforms operate like any other transform except they are terminal, meaning they have no children. The recording transforms may time-tag their recording so that it is suitable for real time playback. Source transforms are used at the root of the transform tree to provide input to the tree which is either recorded or live. If the input is recorded, the time-tags from the recording may be used to play back the recording in real time. The time-tags may also be ignored and the recording is played back as fast as possible, which is typically faster than real time.

Figure 3:
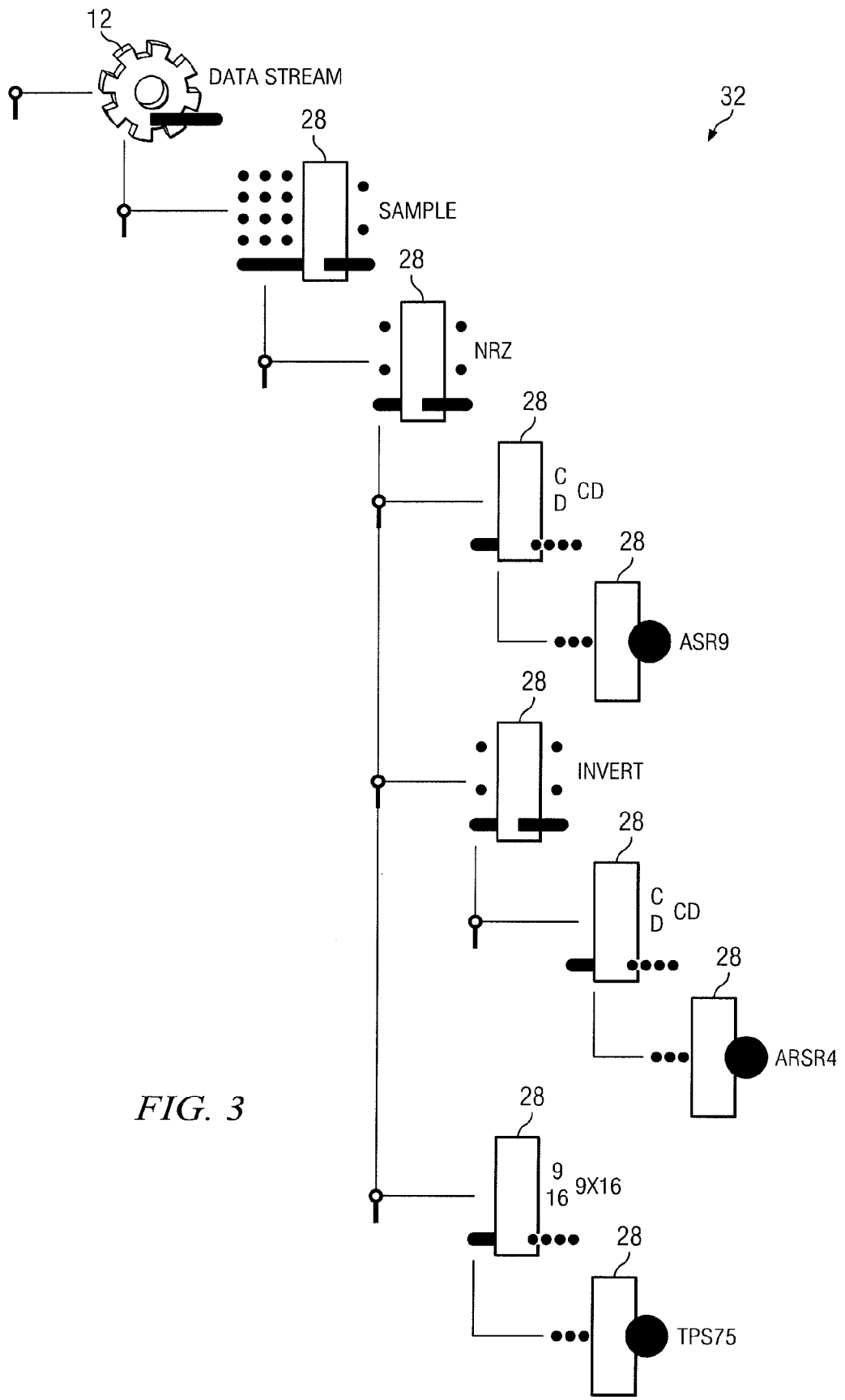
FIG. 3 is an illustration showing one embodiment of an interface operable to arrange, edit, and view the transforms in the transform tree of FIG. 2.

FIG. 3 is an illustration showing one embodiment of an interface 32 provided by computing system 26 operable to arrange, edit, and view a hierarchy of transforms 28 in transform tree 20. This allows for creation, deletion, and modification of the universe of transform sequences represented by transform tree 20. In one embodiment, transforms 28 are human-readable JAVA bean objects, and each individual transform can be edited using the interface 32. The interface may additionally provide a mechanism to allow the threshold value of efficiency to be adjusted by a user, for example by using a slider mechanism. In some embodiments, when a data stream 12 is being processed by data stream identification system 10, the interface 32 provided by computing system 26 is displaying the transform tree 20. Branches of the transform tree 20 with transforms whose computed efficiencies fall below an efficiency threshold may be collapsed. If the efficiencies of the transforms in the branch are later re-computed and are above the efficiency threshold, the branches containing these transforms may be expanded again. Thus, the interface 32 will be visually depicting the most efficient path or paths through the transform tree 20. The interface may provide a mechanism for the user to stop the transforms when the user determines the most efficient path or paths through the transform tree 20.

In one embodiment, a method of data stream identification is implemented as a set of logic embodied in a computer-readable tangible medium. The logic, when executed by a processor 24, is operable to receive a data stream 12 from a data source 30 and iterate through transforms 28 in a transform tree 20 to determine the sequence of transforms necessary to consume the data stream 12.

As discussed, particular embodiments implement data stream identification by evaluation of the most efficient path through a transform tree. While particular applications may be implemented in the radar context, other embodiments may also be implemented in other contexts. For example, consider the application in the context of factories. Each transform in the transform tree corresponds to a factory capable of receiving a raw input (such as raw goods), processing the input, and producing an output as a result of processing the raw input. The output from one factory may be the input to another. In this manner, the most efficient path through a transform tree composed of factories would correspond to the most efficient method of manufacturing a particular product from the raw goods.

Figure 4:
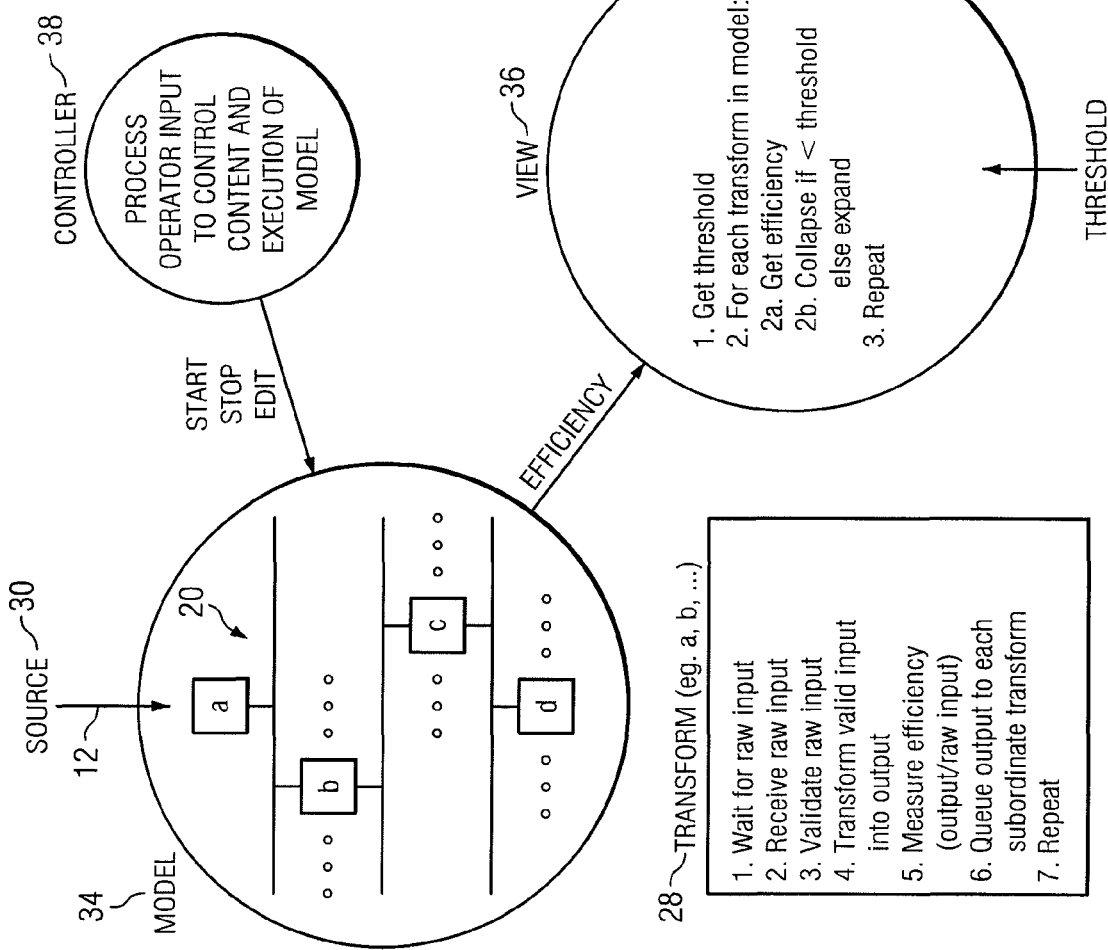
FIG. 4 is a schematic illustration of one embodiment of a data stream identification system.

FIG. 4 is a schematic illustration of one embodiment of a data stream identification system. Model 34 is a representation of the transform tree 20 and the corresponding logic. View 36 renders model 34 into a form suitable for interaction, such as a user interface presented by a display 40. Controller 38 receives input from a user or operator to control the content and execution of model 34.

Model 34 contains the transform tree 20, including the individual transforms a, b, c, and d. A data stream 12 from source 30 is fed into model 34. A transform 28 first waits for raw input. Once the transform 28 receives raw input, the input is validated and the valid input is transformed into output. The efficiency of the transform 28 is then measured as the ratio of output to raw input. Finally, the output from the transform 28 is queued to each subordinate transform 28 and the process is repeated. The transforms 28 in the transform tree 20 are executed in parallel using a multi-threaded execution scheme, thus the described operations of transforms 28 are being concurrently executed.

View 36 first obtains the threshold value of efficiency. For each transform 28 in model 34, view 36 first receives the efficiency computed by the particular transform 28. Next, if the efficiency is less than the threshold, view 36 collapses the branch in display 40 that contains the particular transform. Otherwise, the branch is expanded. This process is repeated for the remaining transforms 28 in model 34.

Display 40 presents user interface 32 rendered by view 36. In this case, display 40 will visually depict the branches of the transform tree 20 that have not been collapsed by view 36, i.e., the branches that contain no transforms 28 with efficiency levels below the threshold.

The controller 38 receives input from the user or operator to control the content and execution of model 34, such as starting, stopping, or editing model 34.

Although the present invention has been described with several embodiments, a myriad of changes, variations, alterations, transformations, and modifications may be suggested to one skilled in the art, and it is intended that the present invention encompass such changes, variations, alterations, transformation, and modifications as they fall within the scope of the appended claims.

What is claimed is:

1. A method for data stream identification, comprising:
   receiving a data stream from an unknown radar data source;
   executing a first transform on the data stream to determine if the data stream comprises a first characteristic associated with the first transform, the first transform part of a transform tree comprising a plurality of transforms arranged in a hierarchy, wherein each branch path of the transform tree corresponds to a different radar source type;
   executing one or more additional transforms to determine if the data stream comprises one or more additional characteristics associated with the one or more additional transforms;
   computing an efficiency level associated with the execution of each transform, wherein the efficiency level is computed as the ratio of useful output to total input of each transform; and
   identifying a path through the transform tree wherein the computed efficiency level of each transform in the path is above a threshold value to determine characteristics of the data stream, wherein identifying the path includes identifying a signal protocol stack of the data stream by identifying a signal protocol stack associated with the path through the transform tree wherein the computed efficiency level of each transform in the path is above the threshold value, the identified path corresponding to a known radar data source.

2. The method of claim 1, further comprising creating the transform tree.

3. The method of claim 2, wherein creating the transform tree comprises receiving input through a graphical interface to arrange, edit, and view the plurality of transforms.

4. The method of claim 1, wherein the data source comprises a radar antenna and the data stream comprises an analog signal from the radar antenna.

5. The method of claim 4, wherein:
   executing a first transform on the data stream comprises attempting to process the data stream using a first protocol component associated with the first transform;
   executing one or more additional transforms on the data stream comprises attempting to process the data stream using one or more additional protocol components associated with the one or more additional transforms; and
   computing an efficiency level associated with the execution of each transform comprises calculating an efficiency level associated with each attempt to process the data stream.

6. The method of claim 1:
   wherein each transform comprises a respective protocol identification object;
   further comprising determining that the data stream includes a first protocol component associated with the first transform upon executing the first transform;
   wherein the one or more additional transforms comprise child nodes to the first transform in the transform tree; and
   further comprising determining that the data stream includes one or more additional protocol components associated with the one or more additional transforms such that it is determined that the data stream comprises a signal protocol stack including the first protocol component and the one or more additional protocol components.

7. A system for data stream identification, comprising a processor operable to:
   receive a data stream from an unknown radar data source;
   execute a first transform on the data stream to determine if the data stream comprises a first characteristic associated with the first transform, the first transform part of a transform tree comprising a plurality of transforms arranged in a hierarchy, wherein each branch path of the transform tree corresponds to a different radar source type;
   execute one or more additional transforms to determine if the data stream comprises one or more additional characteristics associated with the one or more additional transforms;
   compute an efficiency level associated with the execution of each transform, wherein the efficiency level is computed as the ratio of useful output to total input of each transform; and
   identify a path through the transform tree wherein the computed efficiency level of each transform in the path is above a threshold value to determine characteristics of the data stream, wherein identifying the path includes identifying a signal protocol stack of the data stream by identifying a signal protocol stack associated with the path through the transform tree wherein the computed efficiency level of each transform in the path is above the threshold value, the identified path corresponding to a known radar data source.

8. The system of claim 7, wherein the processor is further operable to create the transform tree.

9. The system of claim 8, wherein the processor operable to create the transform tree comprises the processor operable to receive input through a graphical interface to arrange, edit, and view the plurality of transforms.

10. The system of claim 7, wherein the data source comprises a radar antenna and the data stream comprises an analog signal from the radar antenna.

11. The system of claim 10, wherein:
the processor operable to execute a first transform on the data stream comprises the processor operable to attempt to process the data stream using a first protocol component associated with the first transform;
the processor operable to execute one or more additional transforms on the data stream comprises the processor operable to attempt to process the data stream using one or more protocol components associated with the one or more additional transforms; and
the processor operable to compute an efficiency level associated with the execution of each transform comprises the processor operable to calculate an efficiency level associated with each attempt to process the data stream.

12. The system of claim 7, wherein:
each transform comprises a respective protocol identification object;
the processor is further operable to determine that the data stream includes a first protocol component associated with the first transform upon executing the first transform;
wherein the one or more additional transforms comprise child nodes to the first transform in the transform tree; and
the processor is further operable to determine that the data stream includes one or more additional protocol components associated with the one or more additional transforms such that it is determined that the data stream comprises a signal protocol stack including the first protocol component and the one or more additional protocol components.

13. A set of logic embodied in a computer-readable tangible medium, the logic, when executed by a processor, operable to:
receive a data stream from an unknown radar data source;
execute a first transform on the data stream to determine if the data stream comprises a first characteristic associated with the first transform, the first transform part of a transform tree comprising a plurality of transforms arranged in a hierarchy, wherein each branch path of the transform tree corresponds to a different radar source type;
execute one or more additional transforms to determine if the data stream comprises one or more additional characteristics associated with the one or more additional transforms;
compute an efficiency level associated with the execution of each transform, wherein the efficiency level is computed as the ratio of useful output to total input of each transform; and
identify a path through the transform tree wherein the computed efficiency level of each transform in the path is above a threshold value to determine characteristics of the data stream, wherein identifying the path includes identifying a signal protocol stack of the data stream by identifying a signal protocol stack associated with the path through the transform tree wherein the computed efficiency level of each transform in the path is above the threshold value, the identified path corresponding to a known radar data source.

14. The set of logic of claim 13, wherein:
each transform comprises a respective protocol identification object;
the logic, when executed by a processor, is further operable to determine that the data stream includes a first protocol component associated with the first transform upon executing the first transform;
wherein the one or more additional transforms comprise child nodes to the first transform in the transform tree; and
the logic, when executed by a processor, is further operable to determine that the data stream includes one or more additional protocol components associated with the one or more additional transforms such that it is determined that the data stream comprises a signal protocol stack including the first protocol component and the one or more additional protocol components.

* * * * *